Dec. 6, 1955   R. E. SHEAHAN   2,726,033
FAN AND MOTOR UNIT ASSEMBLY
Filed Dec. 7, 1951
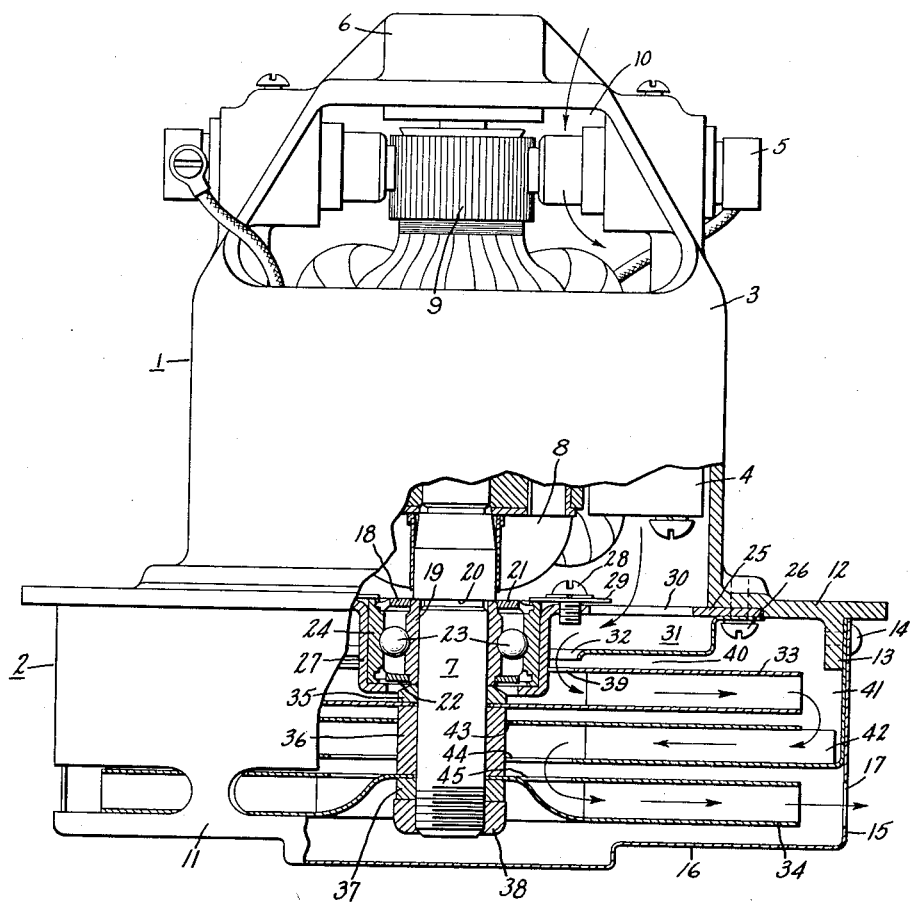
Inventor:
Robert E. Sheahan,
by William B. Edwards, Jr.
His Attorney.

United States Patent Office 2,726,033
Patented Dec. 6, 1955

2,726,033

FAN AND MOTOR UNIT ASSEMBLY

Robert E. Sheahan, Chagrin Falls, Ohio, assignor to General Electric Company, a corporation of New York Application December 7, 1951, Serial No. 260,389

2 Claims. (Cl. 230—117)

My invention relates to an assembly of a centrifugal fan with an electric motor, of the character often used in suction cleaners of the so-called tank type. More particularly my invention relates to improvements in such a fan and motor assembly or unit to decrease the size of the unit, thereby saving space, and to improve the efficiency of operation of the fan and motor unit.

In the design of suction cleaners, it is desirable that the space occupied by the power unit, including the fan and motor, be reduced as much as possible so that the space so saved may be used for additional filtering or dust collecting, or so that less material is needed for making the cleaner casing. One way to reduce size of the power unit is by using a single stage fan. However, a multiple stage fan is often preferred because of its operating characteristics. My invention permits the use of a multiple stage fan while keeping the size down near to that of a single stage fan in a combined fan and motor unit.

Another problem in fan and motor units of the character described, is the possible overheating of the unit because of high operating speeds and because of air recirculated in the unit. Overheating is not only dangerous to the motor, but may also damage the bearings on the shaft of the motor and fan. A further object of my invention is to include in the mounting for the bearings a structure for improved air flow which not only reduces the chance for recirculating of air in the fan and consequent overheating of the fan and motor unit as a whole, but also provides positive improved cooling of the bearing for the fan and motor unit which is most likely to be overheated.

The principal objects of my invention are obtained by a mounting of the motor bearing in nested relation within the first rotary stage of the fan and by the provision of a specially designed baffle plate which directs air toward the bearing and also toward the eye of the first stage of the fan. In order to obtain the improved results, the fan unit is designed so that air passes first through the motor which drives the fan, and then through the fan itself.

Other objects and further details of that which I believe to be novel and my invention will be clear from the following description and claims taken with the accompanying drawing in which is illustrated an example of fan and motor unit assembly embodying the present invention and incorporating my improved bearing mounting and baffle plate. The single figure in the drawing is a side elevation view of a fan and motor unit with portions broken away for clarity in illustration.

A fan and motor unit according to my invention has a motor section 1 and a fan section 2 secured suitably together so that the assembly may be mounted as a unit within the body or casing of a suction cleaner. The motor cap or frame 3 supports the usual stationary field 4 for the motor and the usual brushes 5. At one end of the motor cap, a socket 6 is provided for housing one bearing of the armature shaft 7. The usual armature 8 with its commutator 9 is suitably secured to the shaft. The usual and necessary wiring within the motor and to the motor will be provided as is readily understood.

In order to provide proper air flow through the fan and motor unit, as indicated by the arrows in the drawing, the motor cap is cut away to provide large air intake openings 10 at one end of the cap. This also reduces the weight of material used in the motor cap. The other end of the motor cap or frame furnishes a support for the fan housing 11.

As shown here, the motor cap may be provided with a radially extending annular flange 12 serving as one end of the fan housing, and an axially extending cylindrical flange 13 to which the edges of the fan housing proper may be secured as by the rivets or bolts 14. The annular flange 12 may be extended larger than the fan housing diameter so that the extended part of the flange may be used for mounting the motor and fan unit assembly if desired. It will be noted that the fan housing 11 has a generally cylindrical axially extending wall 15, the edge of which may be secured to the flange 13 on the motor cap, and an end wall 16 which closes the free end of the fan housing. Exhaust slots or holes 17 are shown as provided in the side wall of the housing 11, and extend around the entire circumference of the housing for reasons which will later appear. In place of the slots or holes 17 in the side wall 15, similar slots or holes might be provided in the end wall 16 near its circumference, as should be obvious.

On one end of the motor and fan shaft 7 are mounted the rotary elements or stages of the fan. Although the drawing shows the shaft as extending vertically with the motor on top and the fan below, it should be obvious that these positions might be reversed or the shaft might be mounted in a horizontal or inclined position within the suction cleaner.

One end of the motor and fan shaft is supported in the bearing which is in the cavity 6 of the motor cap as above described. The other end of the shaft extends freely from the motor portion of the assembly but is supported by a bearing 18. The inner race 19 of this bearing fits closely around shaft 7 and abuts against a shoulder 20 on the shaft. As will be seen from the drawing, this bearing is preferably a dust-tight bearing with seals 21 and 22 which seal the balls 23 between the inner race and the outer race 24.

This bearing 18 is supported from the motor cap or frame 3 by means of a motor base plate 25 which is secured as by bolts or screws 26 to the flange 12 of the motor frame. This motor base plate 25 is provided at its center with a bearing supporting cup or pocket 27 preferably formed integrally with the plate. The outer race 24 of the bearing 18 fits closely within this cup 27 and is held therein by a series of bolts or screws 28 which have retaining disks or washers 29 under their heads, the washers extending over the edge of the outer race of the bearing. In place of the retaining screws and washers the bearing may be held in place by other suitable means.

Surrounding the bearing in the motor base plate are a series of ventilating holes 30 which allow air to pass from the interior of the motor cap to the chamber within the fan housing. In order to direct this air toward the bearing mounting or pocket an annular baffle 31 is provided just beyond the openings 30, with a single central air directing opening 32 which surrounds and is spaced from the bearing and its mounting cup. The diameter of opening 32 is less than that of the smallest circle that touches each of the openings 30. Note that the edge of this opening is turned or flanged in the direction of air flow shown by the arrows. The purpose for this will be explained later.

The rotary elements 33 and 34 of the fan are suitably secured to the motor and fan shaft as by a bearing spacer 35 around the shaft between the inner race 19 of the bearing and the fan element 33, a fan spacer ring 36 extending around the shaft between the fans, a fan washer 37 outside of the fan 34 on the shaft, and a fan nut 38 threaded on to the shaft 7. There is a central inlet opening 39 in the fan 33 which surrounds the bearing 18 and its mounting as shown, and is of approximately the same diameter as the opening 32 in the baffle 31. It will be noted that the bearing and its mounting are nested or recessed in the inlet side of the fan element 33 by being positioned within the opening 39. This arrangement saves space along the axial direction of the shaft. Furthermore, and as will be clear from the direction of the arrows, the air flow through this portion of the fan and motor unit is directed toward the bearing mounting. Because of the curved nature of the flange 32 on the motor baffle 31 and because the edge of the opening in this baffle extends close to the opening 39 in the fan 33, the air is directed not only toward the bearing and its mounting cup but possible recirculation of air from the periphery of the fan 33 into the space 40 between the fan and the baffle is virtually prevented. The space 40 is kept as small as possible by mounting the baffle and fan 33 close together. Apart from the size of the inlet opening 39 and the nesting of the bearing and its mounting within the fan 33, this fan may be of any suitable design with the usual disk-like walls and vanes so that upon rotation of the shaft air will pass from the inlet 39 and be thrown outwardly by centrifugal force into a space 41 at the periphery of the fan within the fan housing.

From the space 41, air is directed inwardly toward the axis of the unit and toward the inlet of the second rotating fan stage by a diffuser 42 which is made a part of or held by the main fan housing. I have shown the diffuser here as a separate cup-shaped element or inner fan housing secured under the main fan housing to the flange 13 of the motor frame by the screws or bolts 14. This diffuser has the usual peripheral opening next to the space 41 and disk-like walls extending inwardly, the wall nearest the fan 33 ending in an opening 43 which closely surrounds the fan spacer 36, and the wall next to the fan 34 ending in a much larger opening 44 for passage of air to the next stage as indicated by the arrows. Again the usual guiding vanes may be used for assisting in the direction of air from the outside to the inside of the diffuser.

The final rotary stage of the fan 34 is provided with an inlet opening 45 surrounding the fan shaft on the side nearest the diffuser 42 and its opening 44, and upon rotation of the shaft and the fan, air is thrown outwardly from this final stage of the fan through the openings 17. Some further space may be saved by recessing the fan washer 37 and the fan nut 38 within disk fan element 34 as shown.

As will be evident from the foregoing description, certain aspects of my invention are not limited to the particular details of construction of the example illustrated, and I contemplate that various and other modifications and applications of the invention will occur to those skilled in the art. It is, therefore, my intention that the appended claims shall cover such modifications and applications as do not depart from the true spirit and scope of my invention.

What I claim as new and desire to secure by Letters Patent of the United States is:

1. In a fan and motor unit of the type having a motor frame open at one end and carrying a fan housing open at the other end, a motor in the frame with a shaft extending from the motor into the fan housing, a centrifugal fan including a rotating element fixed to the shaft in the housing, and a bearing on the shaft located between the motor and the fan, that improvement comprising a base plate in the unit separating said frame and said fan housing and supporting said bearing, said plate having a plurality of air flow openings surrounding said bearing, an annular baffle in the fan housing adjacent to and spaced from said plate, said baffle having a single central opening therein surrounding said bearing, said baffle opening having a diameter less than that of the smallest circle that touches each of the air flow openings in said plate, said rotating fan element having a central inlet opening therein of similar size as the baffle opening and also surrounding said bearing, the bearing being thereby nested within the openings in said baffle and said rotating element, said baffle being located closely adjacent said rotating fan element whereby air may enter the open end of the motor frame, pass to said baffle, be directed toward said bearing, enter said fan and pass out through the end of the fan housing.

2. In a fan and motor unit of the type having a motor cap with an air inlet opening at one end of the unit assembled together with a fan housing which has an air outlet opening at the other end of the unit, a motor in the cap with a shaft extending from the motor into the fan housing, a centrifugal fan including a rotating element fixed to the shaft in the fan housing, and a bearing on the shaft located between the motor and the fan, that improvement comprising a base plate inside the unit separating said motor cap and said fan housing, a central bearing mounting pocket in said plate for holding said bearing, said plate having air flow openings therein surrounding said pocket and said pocket extending away from said motor toward said fan, an annular baffle in the fan housing next to and spaced from the base plate, said baffle having a single central air flow opening therein surrounding said bearing and bearing pocket, said baffle opening having a diameter less than that of the smallest circle that touches each of the air flow openings in said plate, said rotating fan element having a central inlet opening therein of similar size as the baffle opening and also surrounding said bearing and pocket, the pocket thereby being nested within the openings in said baffle and said rotating element, said baffle opening being located close to said fan element opening and a curved flange on the edge of said baffle opening directed toward and ending close to the edge of said fan opening.

References Cited in the file of this patent

UNITED STATES PATENTS

| | | |
|---|---|---|
| 1,066,541 | Spencer | July 8, 1913 |
| 1,639,959 | Owen | Aug. 23, 1927 |
| 2,027,158 | Forsberg | Jan. 7, 1936 |
| 2,091,537 | Wahlborg | Aug. 31, 1937 |
| 2,228,750 | Brock | Jan. 14, 1941 |
| 2,280,495 | Martinet | Apr. 21, 1942 |
| 2,328,038 | Taylor | Aug. 31, 1943 |
| 2,364,877 | Smellie | Dec. 12, 1944 |
| 2,454,569 | Rector | Nov. 23, 1948 |
| 2,454,570 | Rector | Nov. 23, 1948 |